US 6,205,124 B1

(12) United States Patent
Hamdi

(10) Patent No.: US 6,205,124 B1
(45) Date of Patent: Mar. 20, 2001

(54) MULTIPOINT DIGITAL SIMULTANEOUS VOICE AND DATA SYSTEM

(75) Inventor: Rabah S. Hamdi, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/777,810

(22) Filed: Dec. 31, 1996

(51) Int. Cl.[7] .......................... H04M 11/00; H04M 7/00; H04L 12/16; H04Q 11/00
(52) U.S. Cl. .......................... 370/260; 370/266; 370/493; 379/202; 379/93.07
(58) Field of Search .................................. 370/260, 261, 370/266, 267, 268, 269; 379/202, 203, 206, 93.09, 93.07

(56) References Cited

U.S. PATENT DOCUMENTS

| | | | |
|---|---|---|---|
| 4,293,946 | * 10/1981 | Kuras et al. | 370/263 |
| 4,578,789 | * 3/1986 | Middleton et al. | 370/260 |
| 5,272,698 | * 12/1993 | Champion | 370/267 |
| 5,390,177 | * 2/1995 | Nahumi | 379/202 |
| 5,428,608 | * 6/1995 | Freeman et al. | 370/261 |
| 5,448,555 | * 9/1995 | Bremer et al. | 370/286 |
| 5,453,986 | * 9/1995 | Davis et al. | 379/202 |
| 5,546,395 | 8/1996 | Sharma et al. | 370/84 |
| 5,553,063 | 9/1996 | Dickson | 370/29 |
| 5,559,792 | 9/1996 | Bottoms et al. | 370/320 |
| 5,602,846 | * 2/1997 | Holmquist et al. | 370/384 |
| 5,644,635 | * 7/1997 | Armbruster | 379/390 |
| 5,805,636 | * 9/1998 | Rao et al. | 375/222 |

OTHER PUBLICATIONS

Digital Simultaneous Voice and Data Protoco Specification 1.2.; 1995 (No Month).
Echo Cancellers Spec. Manual; 1988 (No Month).
ITU–T G.729, General Aspects of Digital Transmission Systems, Coding of Speech at 8 kbit/s Using Conjugate–Structure Algebraic–Code–Excited Linear–Prediction (CS–ACELP); Mar. 1996.

* cited by examiner

Primary Examiner—Huy D. Vu
Assistant Examiner—Kevin C. Harper
(74) Attorney, Agent, or Firm—Akin, Gump, Strauss, Hauer & Feld, L.L.P.

(57) ABSTRACT

A multipoint conferencing system communicates with a first remote digital simultaneous voice and data (DSVD) modem and a second DSVD modem. The multipoint conferencing system has a first DSVD modem adapted to communicate with the first remote DSVD modem and a second DSVD modem adapted to communicate with the second remote DSVD modem. Each DSVD modem has an analog to digital converter and a digital signal processor coupled to the analog to digital converter for receiving data from the remote DSVD modems. The system also has a bridge coupled to the first and second DSVD modems for transferring data between the first and second remote DSVD modems. The bridge contains a speech decoder adapted to receive data from the first and second remote DSVD modems, first and second summers, a speech coder which is adapted to send data to the first and second remote DSVD modems, and a digital data router for collecting digital data from the first and second remote DSVD modems and forward the digital data to first remote DSVD modems, the second remote DSVD modems, or both. To convert the digital data back into the analog domain, the system has a sound generator or speaker, a microphone adapted to receive sound, and an acoustic echo cancelling system for minimizing echo feedbacks from the speaker. In addition to the multipoint DSVD system, a full duplex speaker telephone is also provided to handle voice only conferencing.

31 Claims, 9 Drawing Sheets

MULTIPOINT DIGITAL SIMULTANEOUS VOICE AND DATA SYSTEM

BACKGROUND OF THE INVENTION

1. Field of the Invention

The present invention relates to data communication, equipment, and, more particularly, to a communication system involving simultaneous voice and data modems.

2. Description of the Related Art

The growth of the personal computer industry is attributable in part to the availability of inexpensive, yet powerful computers. Improvements in processor, memory, data storage and communications technologies have resulted in computers which can provide sufficient processing capability for audio visual applications such as computer-aided design, three-dimensional animation, and multimedia presentation for extended durations, even when users are at remote or relatively inaccessible locations.

The communication of digital information such as data over analog transmission links such as telephone lines and trunks is known in the art. At the transmitting end of the link, a modem uses a representation of the digital information to modulate a carrier frequency and transmits the modulated carrier frequency on the transmission link. At the receiving end of the link, another modem demodulates the carrier frequency to retrieve the representation of the digital information, and reconstitutes the digital information therefrom. A pair of modems can thus engage in a communication protocol that includes control and signalling to set up and terminate the communication connection.

The continuing development of computer and telephone communication systems requiring expanded data conversion and processing capabilities, however, is taxing the transmission capability of existing telephone networks in that separate lines are required for computer communications and for human conversations. To reduce this load, voice and data modems recently appeared which allow a voice communication channel to be carried out simultaneously with a data communication channel such that both channels appear as a single communication to the transmission facility that interconnects the modems. Simultaneous voice and modem data transmitted over the same communications link between two sites has been accomplished in several ways. The most common communications links between two sites is the telephone line. The most common data handling equipment to communicate over a communications link is the computer modem which modulates digital data onto a carrier for transmission in the voice band of a telephone line. A wide variety of modulations standards promulgated by such international groups as ITU for communications in the voice band exist. In these schemes, the voice channel is typically created by modulating a second carrier frequency with the representation of the voice signals. Alternatively, a digital implementation of the voice and data modem allows voice signals to be encoded in digital form and the encoded voice and data are multiplexed for transmission to the other side.

Currently, one simultaneous voice over data standard known as digital simultaneous voice and data (DSVD) is standardized in an International Telecommunication Union specification ITU-T Recommendation V.70. DSVD improves upon other simultaneous voice and data technologies by allocating bandwidth to both jobs with the ability to simultaneously support voice transmission at 9.6 kilobauds per second on a standard telephone line while the remaining bandwidth is available for data transmission. Thus, by providing the ability for a single point-to-point connection to share user data and exchange voice at the same time, DSVD allows the simultaneous exchange of data and digitally encoded voice signals over a single dial-up phone line. The voice quality is essentially the same as that provided over present phone lines. DSVD modems use V.34 modulation which provides up to 33.6 kilobits per second.

The arrival of the wide range of modems conforming to the DSVD standard eliminates in many cases the need for two separate phone lines (one for voice, and one for data) when using collaborative applications such as desktop personal conferencing or interactive games. However, with the increasing number of organizations located in multiple sites, effective group working requires communications facilities that can join together more than two locations. Multi-point communications provides such a facility for both audiovisual and data communications, overcoming current point-to-point network constraints. The need for multiple DSVD connections is essential when multiple users need to share the data and exchange voice simultaneously over the same link. However, present day DSVD solutions do not support such multiple DSVD connection. Thus, a need exists for low cost sharing of data and the exchange of voice information at end-user premises.

SUMMARY OF THE INVENTION

The present invention facilitates the sharing of data and the exchange of voice information over a network of DSVD modems, including a first remote digital simultaneous voice and data (DSVD) modem and a second remote DSVD modem. The multipoint conferencing system provides a first DSVD modem adapted to communicate with the first remote DSVD modem and a second DSVD modem adapted to communicate with the second remote DSVD modem. Each DSVD modem has an analog to digital converter and a digital signal processor coupled to the analog to digital converter for receiving data from the remote DSVD modems.

The system also provides a bridge which is connected to the first and second DSVD modems for transferring data between the first and second remote DSVD modems. The bridge contains a speech decoder adapted to receive data from the first and second remote DSVD modems, first and second summers, a speech coder which is adapted to send data to the first and second remote DSVD modems, and a digital data router for collecting digital data from the first and second remote DSVD modems and forwarding the digital data to first remote DSVD modems, the second remote DSVD modems, or both. To convert the digital data back into the analog domain, the system has a sound generator or speaker, a microphone adapted to receive sound, and an acoustic echo cancelling system for minimizing echo feedbacks from the speaker. In addition to the multipoint DSVD system, a full duplex speaker telephone is also provided to handle voice only conferencing.

Thus, the multipoint conferencing system of the present invention enables the sharing of data and the exchange of voice information over a network of DSVD modems. The multi-point communication capability of the present invention facilitates both audiovisual and data communications, overcoming current point-to-point network constraints. The multiple DSVD connections thus supports multiple users who need to share the data and exchange voice simultaneously over the same link. In this manner, the present invention provides an effective group working atmosphere using communications facilities that can join together more than two locations.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
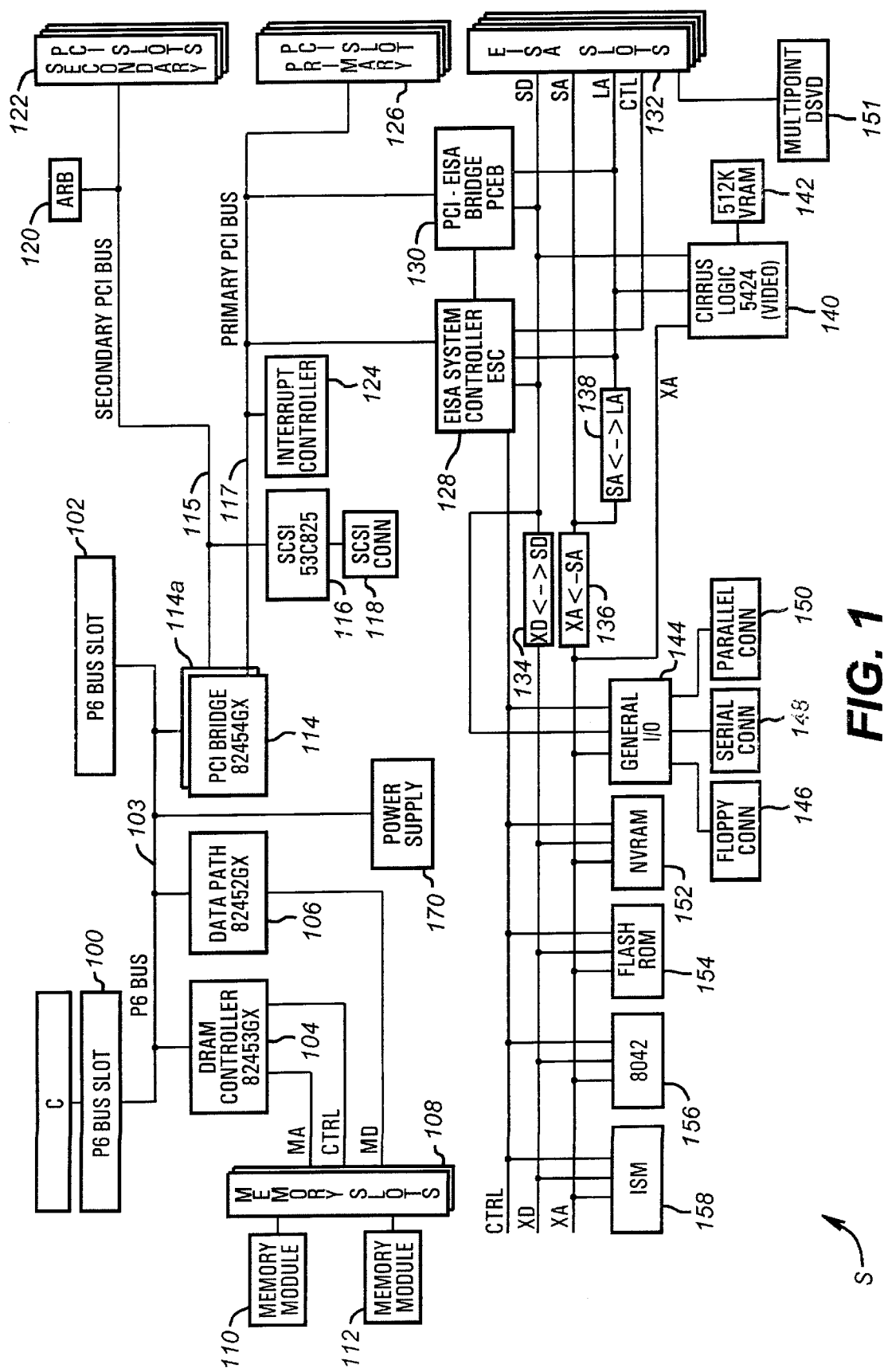
FIG. 1 is a schematic diagram of a computer system supporting the multipoint digital simultaneous voice and data system of the present invention.

Turning now to the drawings, a computer system S supporting the multipoint DSVD conferencing capability of the present invention is disclosed in FIG. 1. The computer system S of FIG. 1 deploys one or more processors, preferably the Pentium Pro™ processor available from Intel Corporation located in Santa Clara, Calif. The Pentium Pro™ processors reside on a processor card C which is plugged into one of the P6 slots 100–102. The P6 slots 100–102 are connected to a 72-pin Pentium Pro™ host bus called the P6 bus 103. The P6 bus 103 is a high performance bus which preferably supports two processor cards mounted on slots 100–102. Preferably, each processor card C supports two Pentium Pro™ processors. Thus, the preferred embodiment supports up to four processors.

In addition to the processors, the P6 bus 103 is connected to a memory controller 104 and a data path device 106 which collectively form a DRAM control subsystem. Preferably, the DRAM controller is an 82453GX and the data path device 106 is an 82452GX, both of which are available from Intel Corporation.

The DRAM controller 104 provides control and timing to the memory subsystem, while the data path device 106 interfaces the 72-bit P6 host bus to the memory array. The memory controller 104 and the data path 106 are capable of taking a memory request from the CPU, queuing it, and responding after the requested operation has completed. Additionally, the controller 104 provides memory error correction which is vital in error-free applications, including the capability of single- bit error correction and multi-bit error detection on the fly. The memory controller 104 can handle up to four gigabytes of page mode DRAM. Memory arrangements having non-interleaved, x2 and x4 interleaving configurations are supported by the memory control sub-system.

A plurality of memory modules 110–112 are connected to memory slots 108 to provide up to four gigabytes of memory. These modules often have a standard width of 9 bits, with a relevant number of times 1 or times 4 chips, allocated to reach the indicated storage capacity, such as one megabyte, four megabytes or 16 megabytes. Thus, a 1M×9 module may comprise nine 1 Mb chips with the organization of 1Mb×1, or two four-megabyte chips with the organization of 1Mb×9 for data, as well as one megabit chip with the organization of 1Mb×1 for parity information. The SIMM modules must be inserted into the intended sockets of the banks. Internally, the modules often combine pair by pair or four by four to realize a main memory with a data width of 16 or 32 bits. Thus, SIMM modules offer versatility in configuring the computer memory and are available in individual sizes from one megabyte to 64 megabytes per SIMM.

Usually, the RAM is divided into several banks, although it could also be made of memory modules such as single in-line memory modules or single in-line package. Each package has to be fully equipped with memory chips, meaning that a main memory may extend it bank by bank—the memory of a partially-equipped bank will not be recognized by the PC. The CPU stores data and intermediate results, as well as programs, in its RAM and reads them later. For this, the processor has to tell the memory which data it wants to read prior to sending the memory and address, akin to the housed number of the data unit requested. The address information is provided by an address bus to the CPU, and the transfer of data from the RAM back to the CPU is performed using a data bus. Generally, in computer terms, a bus means a number of lines through which data and signals are transferred. Therefore, the address bus consists of 32-bit address lines in the case of 386, 486 or Pentium processors. Furthermore, the data bus for these processors is also 32-bits in width to improve the data transfer performance. During operation, the actual performance of the memory subsystem will depend in part on the mix of read and write operations and the memory access patterns for a given application. The controller 104 minimizes the impact of the idle cycles by allowing read operations to bypass around the write operations and be completed first as long as the memory addresses for the read/write pair do not match.

In addition to the memory controllers, a robust input/output system is needed for the computer system S. The I/O subsystem designed for the system S must be scalable while meeting the performance requirements for the four Pentium Pro™ processors. The PCI bus provides a combination of high performance and scalable I/O for the demanding environment faced in high performance applications. To provide PCI connections, one or more PCI bridges 114 are connected to the P6 bus 103. The peer-to-peer arrangement of the PCI bus eliminates one or more levels of arbitration present in the hierarchical arrangement, resulting in higher system performance.

Preferably, the PCI bridge 114 is an 82454GX PCI bridge (PB) from Intel which integrates the bus arbitration logic required to connect up to two 82454GX PB components without any external glue logic. In the preferred embodiment, one PCI bridge is configured to be the compatibility PCI bridge by strapping options at power-up. This PCI bridge provides the PC compatible path to the boot ROM and the EISA/ISA bus.

A second PCI bridge 114a, called an auxiliary bridge, is configured by strapping options to be the auxiliary PCI bridge. The auxiliary bridge 114a controlling the secondary PCI bus has an arbiter 120 which arbitrates accesses to the host after the compatibility bridge 114 has been serviced. Additionally, a system that requires more than two 82454GX PBs must provide an external arbiter.

Normally, the arbitration for the processor bus is controlled by the compatibility bridge, which will have a higher priority than the auxiliary bridge to ensure a proper response time for ISA bus masters. The plurality of PCI bridges 114 provides a plurality of PCI buses, which because of their direct connections to the P6 bus 103, provides inherently faster arbitration response than the alternative of cascading PCI bridges together to provide for multiple PCI buses. This ability not only provides for design flexibility, but also for redundant I/O channels for systems in which reliability is paramount.

As in the DRAM controller 104, the PCI bridge 114 supports a full 64-bit interface to the CPU bus, including support for all protocols as well as error correction. The PCI bridge 114 supports an 8-deep transaction in-order queue as well as separate 4-deep queues for both outbound (processor to PCI) and inbound (PCI to processor) transactions that are for the I/O bus agent. Also, like the DRAM controller 104, the PCI bridge 114 provides four 32-byte data buffers in both the inbound and outbound directions. The buffers decouple the host bus 103 from the PCI buses 115–117 and optimize performance by allowing the posting of data at full bus speeds in both directions. However, unlike the DRAM controller 104, the PCI bridge 114 supports up to two outstanding deferred-reply requests. This feature allows a bus transaction to be split and completed later, preventing the Pentium Pro™ P6 bus 103 from becoming blocked by long latency I/O operations. In this mode, the PCI bridge 114 would defer Pentium Pro™ memory reads, I/O reads, I/O writes, and interrupt acknowledge transactions. However, memory write transactions are not deferred since they are better optimized through posting.

Attached to the secondary PCI bus 115 is a SCSI disk controller 116. The SCSI controller 116 provides the capability of handling simultaneous disk commands which is necessary in a multi-threaded, multi-tasking operating system. Preferably, the SCSI controller 116 is a 53C825 available from NCR Corporation. Attached to the 53C825 is one or more SCSI connectors 118 which drives a plurality of disk drives adapted to support the host system's simultaneous issuance of multiple commands to one or more SCSI devices. The ability to overlap commands and queue the commands to one or more devices can significantly boost performance in environments such as Windows 95 and NT. In addition to the SCSI controller 116, a plurality of devices may be plugged into the secondary PCI bus 115 over a plurality of secondary PCI slots 122.

On the primary PCI bus 117, an interrupt controller 124 handles interrupt requests coming into the PCI bridge 114 for eventual transmission to one of the processors in slots 100–102. The interrupt controller 124 routes interrupt requests from devices located on PCI buses 115–117 to the processors on slots 100–102 during multiprocessor operation. Additionally, a number of PCI peripherals may be plugged into a plurality of primary PCI slots 126.

An EISA system controller (ESC) 128, preferably the Intel 82374EB device, and a PCI-EISA bridge (PCEB) 130, preferably the Intel 82375EB, are also connected to the primary PCI bus 117. The ESC 128 and the PCEB 130 must be connected to the primary PCI bus 117, as the auxiliary bus controller must request arbitration from the compatibility bus controller 114 on some operations. That added latency means that the auxiliary bus or secondary PCI bus 115 cannot meet PCI version 2.1 latency specifications, and that EISA and ISA bus bridges have to be on the compatibility bus or primary PCI bus 117.

The ESC 128 and the PCEB 130 work in tandem to provide an EISA I/O subsystem interface for the computer system S. The combination of the ESC 128 and the PCEB 130 provides an I/O subsystem capable of taking advantage of the power of the PCI bus architecture while maintaining access to a large base of EISA and ISA expansion cards, and the corresponding software applications.

With the inclusion of the ESC 128 and the PCEB 130, the system S now contains three levels of buses structured in the following hierarchy: a P6 bus 103 as the execution bus; an expansion bus system having a primary and secondary PCI bus 115–117; and EISA or ISA bus as a secondary I/O bus. This bus hierarchy allows concurrency for simultaneous operation on all three bus environments. Data buffering permits concurrency for operations that cross over into another bus environment. The ESC 128 implements system functions such as timer/counter, DMA, interrupt controller, and EISA subsystem control functions such as EISA bus controller and EISA bus arbiter. The PCEB 130 provides the interface to the bridge between the PCI and EISA buses by translating bus protocols in both directions. It uses extensive buffering on both the PCI and EISA interfaces to allow concurrent bus operations.

The ESC 128 and the PCEB 130 are connected to a plurality of EISA/ISA slots 132. Additionally, the ESC 128 also generates chip selects for certain functions that typically reside on an X bus. The ESC 128 generates chip select signals from an integrated system management unit (ISM) 158, a keyboard controller 156, a flash ROM 154, a non-volatile RAM 152, and a general purpose I/O device 144 which supports floppy drives, serial ports, and parallel ports over floppy connectors 146, serial connectors 148, and parallel connectors 150.

The EISA/ISA slots 132 have system data lines connected to the data bus of the X bus via a buffer 134 which provides accesses to I/O devices as well as the system BIOS in the flash ROM 154. Further, the EISA slots 132 have system address lines that are connected to the address lines of the X bus via buffer 136. The EISA slots 132 have latched address lines which are connected to the system address lines via buffer 138. Finally, a video controller 140 is connected to the X bus address lines, the EISA/ISA slot 132 system data lines, and the latched address lines. Preferably, the video controller is a Cirrus Logic 5424 controller. The video controller 140 is connected to a video RAM 142 which is preferably 512 kilobytes in size.

Figure 2A:
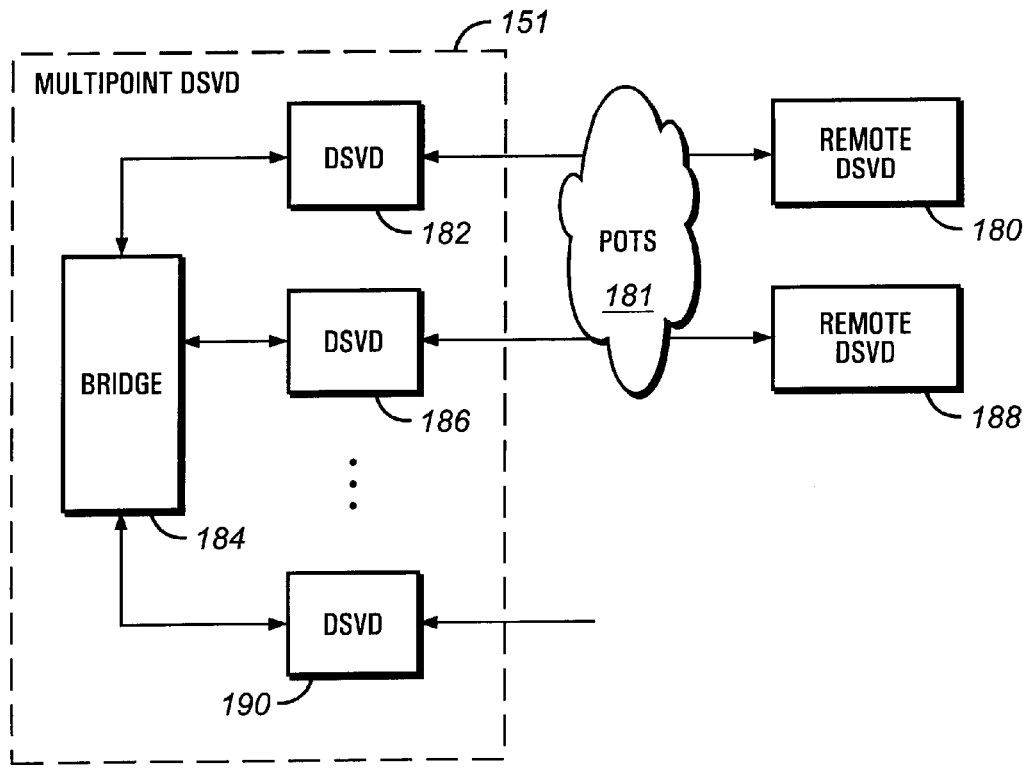
FIG. 2A is a diagram illustrating the operation of DSVD modems in conjunction with a bridge in the present invention.
Figure 2B:
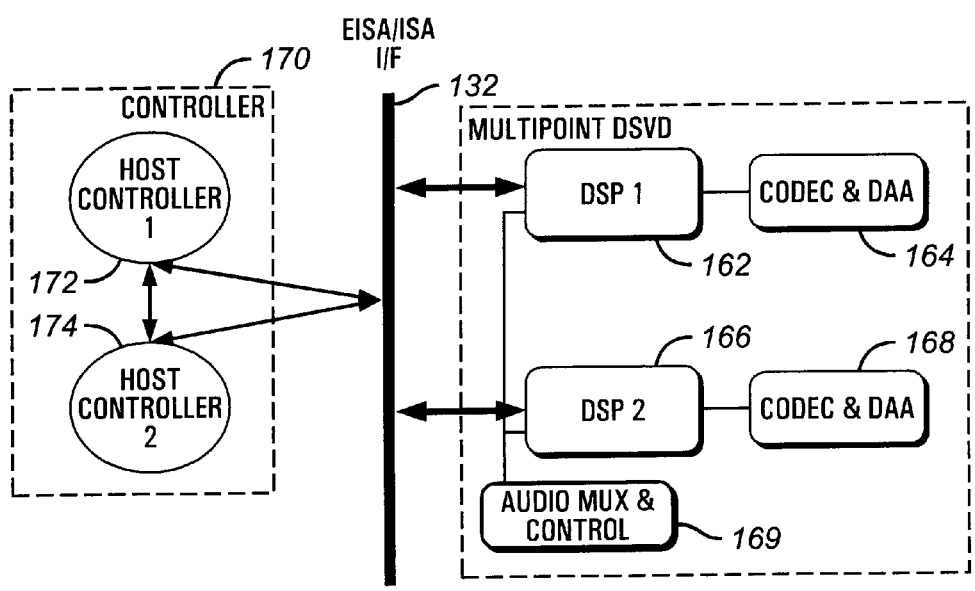
FIG. 2B is a second embodiment of the multipoint digital simultaneous voice and data system for connecting the computer of FIG. 1 with two remote DSVD modems.

The EISA/ISA slots 132 further receive one or more multipoint DSVD systems 151 which are described in FIGS. 2A and 2B. Turning now to FIG. 2A, a diagram illustrating one embodiment of the multi-point DSVD conferencing of the present invention is shown. In FIG. 2A, the multi-point DSVD system 151 has one or more DSVD modems 182, 186 and 190. These DSVD modems are adapted to communicate with a plurality of remote computers via their respective DSVD modems over a conventional telephone network 181, commonly referred to as a plain old telephone service (POTS) network. Each remote computer has a DSVD modem 180 or 188. The multipoint DSVD system 151 includes an audio system for driving speakers and receiving input form the microphone as well as two or more modems connected to two or more lines for accessing the POTS 181.

In FIG. 2A, the remote computer with the DSVD modem 180 communicates over the POTS 181 to the first DSVD modem 182 of the multipoint DSVD system 151. Additionally, a second remote computer having the second DSVD modem 188 communicates over the POTS 181 to the computer system S via a second DSVD modem 186. The local computer system S further supports additional DSVD modems 190 to provide additional multi-point teleconferencing capabilities as desired. Each of the DSVD modems 182, 186, and 190 are connected to a bridge 184 which broadcasts or shares data to and from remote DSVD modems 180 and 188, resulting in a DSVD conferencing system that can handle a plurality of conferencing connections.

A second embodiment of the present invention having a two remote point DSVD conference capability is shown in FIG. 2B. In FIG. 2B, the add-on multi-point DSVD modem 160 has a first digital signal processor (DSP) 162 and a second DSP 166. The DSP 162 is connected to a first coder/decoder (CODEC) and data access arrangement (DAA) 164 to provide a connection to the POTS 181 of FIG. 2A. Similarly, the second DSP 166 is connected to a second CODEC and DAA device 168. The CODEC and DAA devices 164 and 168 provide an interface to the POTS public switch telephone network 181, as is conventional. Furthermore, the first and second DSP devices 162 and 166 are connected to an audio multiplexer and control block 169 which supports the audio conferencing capability of the present invention.

Additionally, the DSP devices 162 and 166 are plugged to one of the EISA/ISA slots 132 to allow the devices 162 and 166 access to the ISA bus. Data generated by the DSP devices 162 and 166 are communicated over the ISA bus to a controller module 170 having one or more host controllers 172 and 174. Furthermore, the host controllers 172 and 174 are also connected together so that they can transfer digitized audio as well as digital data among the parties being conferenced together.

Figure 3:
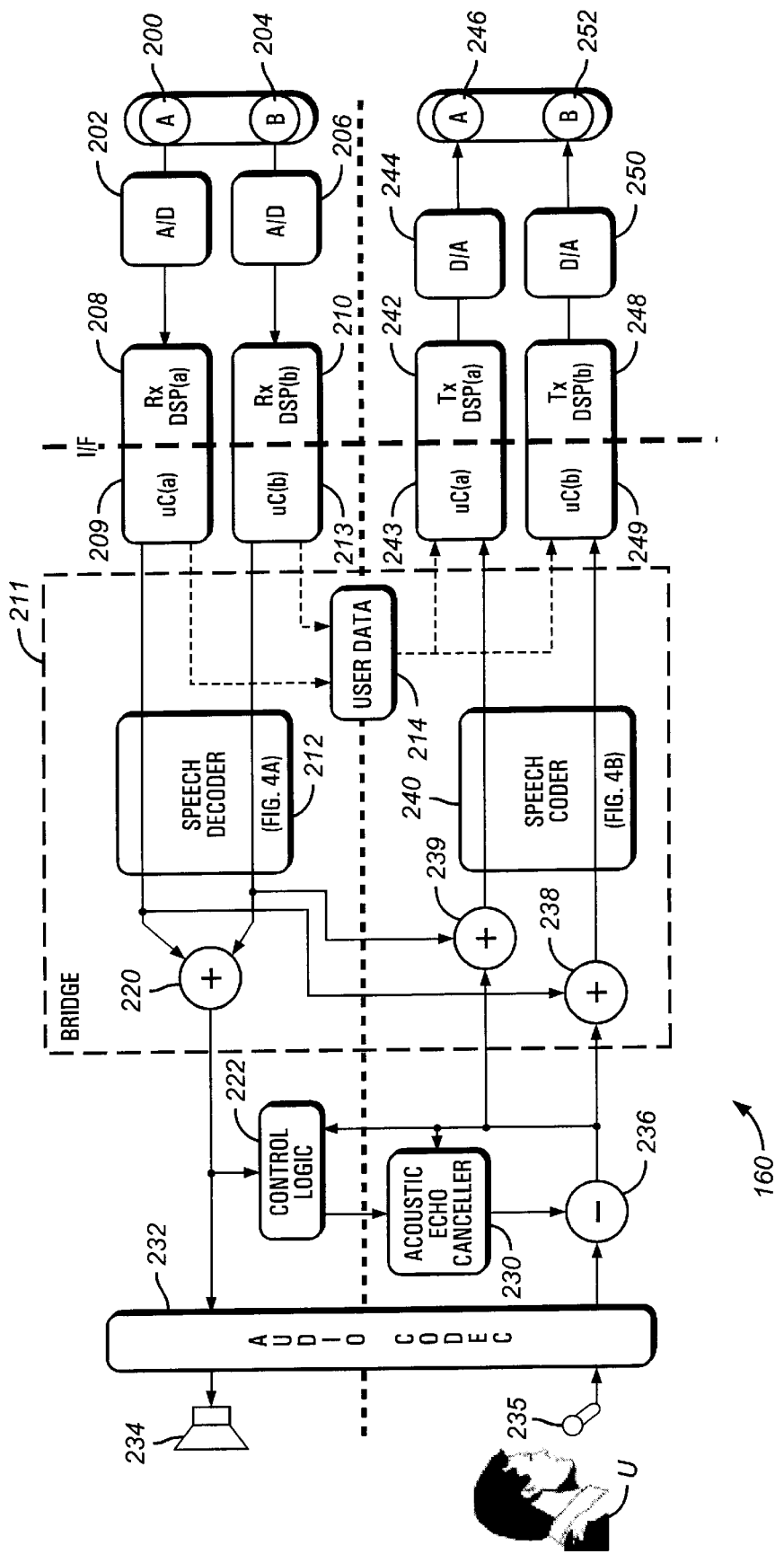
FIG. 3 is a block diagram illustrating in more detail the components of the multipoint digital simultaneous voice and data system of FIG. 2B.

Turning now to FIG. 3, the multi-point DSVD conferencing system 160 of FIG. 2B is shown in more detail. Multiplexed audio and data from the remote DSVD modem 180 is communicated over the analog telephone line of the POTS 181 to an A connector 200. Similarly, multiplexed audio and data from the remote DSVD modem 188 is communicated over the analog telephone line of the POTS 181 to an B connector 204. The data received at the A connector 200 and the B connector 204 are provided to respective analog to digital (A/D) converters 202 and 206. The digitized signal from the A/D converter 202 is sent to a DSP input portion 208 which then demodulates that signal to produce a bit stream going to a controller portion 209, which can be either a dedicated microcontroller or the CPU of the computer system S. The controller portion 209 demultiplexes the audio channel from the data channel and sends the audio channels to a speech decoder 212, which is a part of a bridge 211.

Similarly, data from the second remote DSVD modem 188 is received at the B connector 204, which in turn sends the multiplexed audio plus data information to an A/D converter 206. The digitized data from the converter 206 is provided to a DSP input portion 210 which demodulates that signal and sends the bit stream to a controller portion 213. The controller portion 213, preferably the CPU C of the computer system S, then demultiplexes the audio channel from the data channel. Although the CPU C preferably performs the processing of incoming audio and data signals, the present invention contemplates that dedicated microcontrollers can be used to provide the processing capability as well.

The audio channel output of the controller portion 211 of the DSP input portion 210 is provided to the speech decoder 212 of the bridge 211. The speech decoder 212 then synchronizes and decodes the incoming audio channel outputs. Further, the speech decoder 212 outputs are summed by a summer 220. In this manner, voices at the remote end are combined before they are sent to an audio CODEC 232 which drives a speaker 234 and a microphone 235 which receives voice from the user U. Thus, the digital audio stream that comes out of the summer 220 is going through a digital to analog converter in the CODEC 232 before it is submitted to the speaker 234.

Meanwhile, the summed audio signal is sampled by a control logic block 222 which forwards the summed audio output to an acoustic echo canceller 230 in order to save a replica of the echo that may come back from the speaker 234 into the microphone 235. By cancelling a replica of the sound generated by the speaker 234, the echo is subtracted from the user U's voice by a subtractor 236. Further, the error signal detected by the subtractor 236 is sent back to the acoustic echo canceller 230 and the control logic 222 for adaptation.

The output of the subtractor 236 is fed into a summer 238 of the bridge 211 so that the user's voice or audio can be added to the remote users' voices. The summer 238 also receives the audio data received from the A connector 200. The output of the summer 238 is provided to a speech coder 240 for compression and eventually delivered to the controller portion 249. Similarly, the output of the subtractor 236 is provided to a second summer 239. The summer 239 also receives the audio data received from the B connector 204. The output of the summer 239 is provided to the speech coder 240 for compression and eventually delivered to the controller portion 243. Thus, the output of the coder 240 is presented to the appropriate controller portions 243 and 249 for multiplexing audio information with the appropriate data streams or channels coming out of a digital data router 214. The data router 214 receives digital signals from controller portions 209 and 211.

Once the audio and data channels have been multiplexed, the bit stream goes to the DSP output sections 242 and 248 where the signals are converted to analog streams or analog signals going back to the appropriate telephone line of the POTS 181.

Figure 4A:
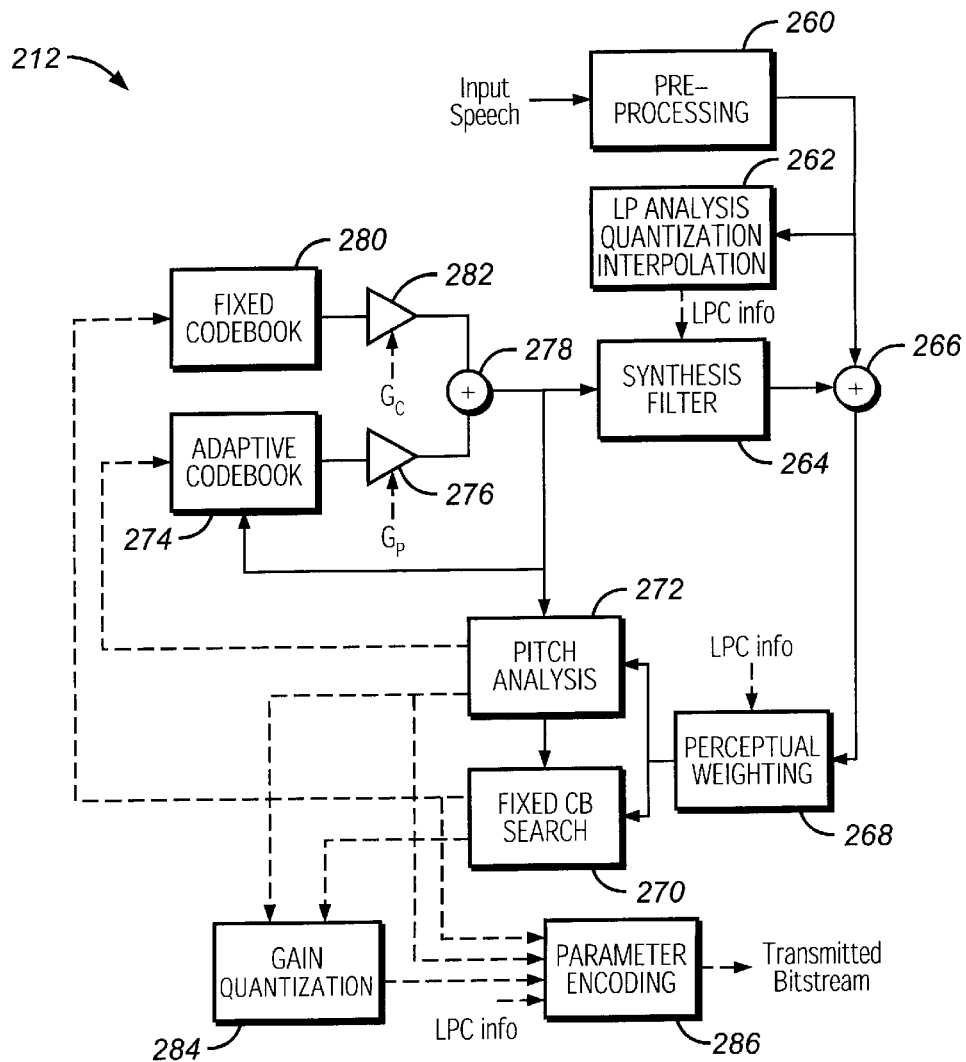
FIG. 4A is a block diagram showing in more detail a speech decoder of FIG. 3.
Figure 4B:
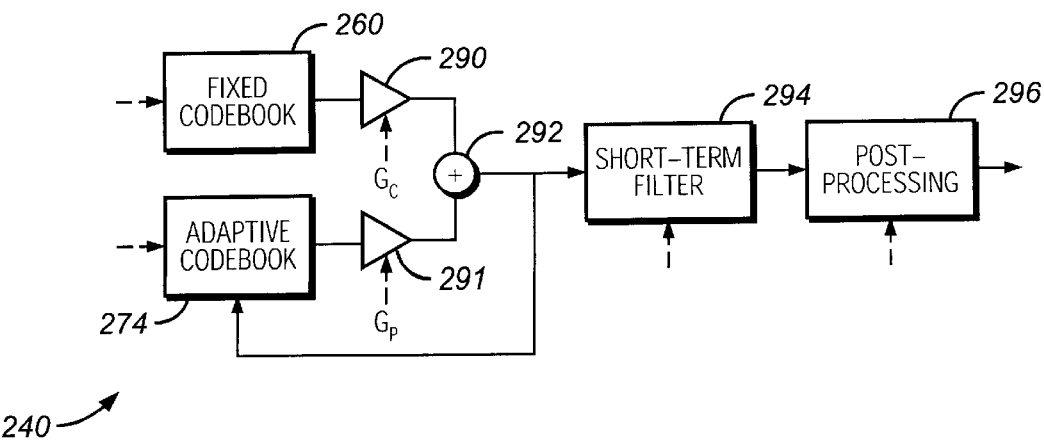
FIG. 4B is a block diagram showing in more detail a speech coder of FIG. 3.

Turning now to FIGS. 4A and 4B, the speech decoder 212 and the coder 240 are shown in more detail. Speech coder and decoder are necessary many speech transmission and store and forward systems. Audio and voice coding is used to compress audio and voice information for efficient storage or transmission. Because the human ear detects sound from a minimum of about 5 hertz to a maximum of about 20 kilohertz, audio coders encode signals up to 20 kilohertz and CD quality audio systems provide about 20 kilohertz of frequency band width. This relatively large bandwidth is desired for high fidelity music listening, especially for classical music. However, the majority of audio information is located in the lower half of the 20 kilohertz band. As human speech frequency content is no longer present above frequencies around 7 kilohertz, telephone lines only provide about 4 kilohertz of bandwidth. Hence, voice coders typically focus on a telephone bandwidth audio compression at approximately 4 kilohertz. Some multimedia and teleconferencing applications provide higher voice quality than a telephone by offering 7 kilohertz of audio bandwidth.

After the coding/decoding operation, audio signals are then compressed and decompressed, respectively. Compression is achieved by removing predictable, redundant or predetermined information from a signal. Quality and bit rate for speech coders vary from toll quality at 32 kilobits per second (kbps) to intelligible quality at 2.4 kbps. Voice coding techniques, such as full duplex 32 kbit/s ADPCM, CVSD, 16 kbits/s sub-band coders, and LPC, are frequently used with voice transmission and storage. The speech coder preferably conforms to the ITU G.729A standard. However, the ITU standard G.723 or G.729 can also be used. The G.729 standard differs from the G.729A standard in the frame size. As specified by the ITU, the G.729A standard has a 8 kilobits per second bit rate, with better quality than that provided by the ITU G.726 standard. The DSVD voice/data multiplexing scheme is an extension of the V.42 error correction protocol used widely in modems today.

Turning now to FIG. 4A, the speech decoder 212 is shown in more detail. In general, the decoder 212 extracts parameter indices from the received bit stream. These indices are decoded to obtain coder parameters corresponding to the speech frame. These parameters include LSP coefficients, two fractional pitch delays, two fixed code book vectors and two sets of adaptive and fixed code book gain values. The LSP coefficients are interpolated and converted to a linear predictive (LP) filter coefficient for each frame. The operation of the speech coder 240 and the speech coder 212 is illustrated in more detail in an ITU document entitled "Coding Of Speech At 8 bit/s Using Conjugate-Structure Algebraic-Code-Excited Linear-Predication" (CS-ACELP) of the ITU-Recommendation G.729 dated March, 1996, hereby incorporated by reference.

In FIG. 4A, input speech is provided to a pre-processing block 260. Further, the output of the pre-processing block is provided to a linear predictive (LP) analyzer, quantizer, and interpolator 262. The LP code (LPC) information generated by the analyzer 262 is then provided to a synthesis filter 264. Furthermore, the output of the pre-processing block 260 and the synthesis filter 264 are provided to a summer 266 which sums the signals. The output of the summer 266 is then provided to a perceptual weighing unit 268, along with the LPC information. The output of the perceptual weighing unit 268 is then provided to a fixed code book search unit 270 as well as a pitch analyzer 272. The output of the pitch analyzer 272 is provided to an adaptive code book 274 as well as to the synthesis filter 264. The output of the adaptive code book 274 is provided to a buffer 276. Similarly, the output of the fixed code book surge unit 270 is provided to a fixed code book 260 whose output drives a buffer 282. The output of the buffers 282 and 276 are provided to a summer 278 which generates an output back to the synthesis filter unit 264. Furthermore, the outputs of the pitch analyzer 272 and the fixed code book search unit 270 are provided to a gain quantizer 284. The output of the pitch and analyzer 272, the fixed codebook search unit and the gain quantizer 284, as well as the LPC information are provided to a parameter encoder 286 that generates a transmitted bit stream to eventually be received by the speech coder 240.

Turning now to FIG. 4B, the block diagram illustrating the speech coder 240 is shown in more detail. The coder 240 is designed to operate with a digital signal obtained by first performing telephone bandwidth filtering of the analog signal, then sampling it at 8 kilohertz, followed by conversion to a 16 bit linear pulse coded modulation (PCM) for the input to the encoder of FIG. 4A. The coder 240 is based on a code excited linear prediction (CLEP) coding model. The coder operates on speech frames of 10 milliseconds corresponding to 80 samples at a sampling rate of 8,000 samples per second. For each frame, the speech signal is analyzed to extract the parameters of the self-model (linear prediction filter coefficients, adaptive and fixed code book indices and gains). These parameters are encoded and transmitted. At the decoder 212, these parameters are used to retrieve the excitation and synthesis filter parameters. The speech is then reconstructed by filtering this excitation through the short term synthesis filter. Generally, the short term synthesis filter is based on a tenth order linear prediction filter. The long term or pitch synthesis filter is implemented using an adaptive code book approach.

Referring now to FIG. 4B, the coder 240 has a fixed code book 260. The output of the fixed code book 260 is provided to a buffer or amplifier 290. Similarly, the coder 240 has an adaptive code book 274. The output of the adaptive code book 274 is provided to a buffer 291. The output of the buffers 290 and 291 is summed using a summer 292, the output of which is provided back to the adaptive code book 274 for adaptation and also to a short term filter 294. The output of the short term filter 294 is provided to a post processing circuit 296 for additional enhancements as necessary.

Figure 5:
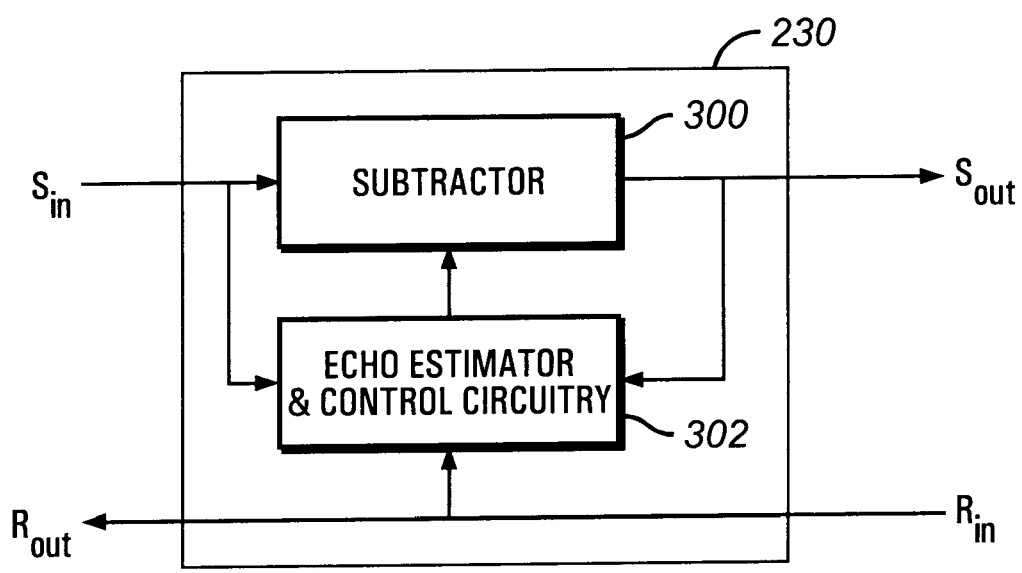
FIG. 5 is a block diagram illustrating in more detail an acoustic echo canceller of FIG. 3.

FIG. 5 illustrates the acoustic echo canceller 230 in more detail. In noise cancellation systems, an adaptive finite impulse response (FIR) or a sub-band filter is typically used to perform the noise modeling function and to adaptively cancel the echo caused by impedance mismatches in the telephone transmission line of the POTS 181 and echo between the speaker output and the microphone input. As shown in FIG. 5, the acoustic echo canceller 230 has a subtractor 300 having a send-in port and a send-out port. The send-out port of the subtractor 300 is connected to an echo estimator and control circuitry 302. The echo estimator and control circuitry 302 is also connected to the send-in port. Additionally, the acoustic echo canceller 300 has a receive-in port and a receive-out port. The receive-in port is connected to the echo estimator and control circuitry 302. The echo estimator and control circuitry block 302 is also connected to the subtractor block 300.

The acoustic echo canceller 230 of FIG. 5 essentially cancels out the sound generated by the speakers 234. The echo present at the input port of the echo canceller is a distorted and a delayed replica of the incoming speech from the speaker 234, as modified by the echo path. The echo path is commonly described by an impulse response. This response of a typical echo path shows a path delay $T_r$ due to the delays inherent in the echo path transmission facilities, and a dispersed signal due to band limiting and multiple reflections. The sum of these is the echo path delay $T_d$. The values of the delay and the dispersion varies depending on the properties of the echo paths.

The echo canceller 230 of FIG. 5 synthesizes a replica of the echo path impulse response by retrieving the output of the adder 220 (FIG. 3). Further, when there is received speech and the nearer party begins to double talk an echo canceller may interpret the transmit signal as a new echo signal and attempt to adapt to it. Preferably, the echo canceller 230 of FIG. 5 uses an algorithm which causes a slow adaptation during period of double talk. Further, the echo canceller 230 of FIG. 5 preferably has a rapid convergence of 1½ second, subjectively low return noise level during a single talk of −50 db, and a low divergence during double talk.

Figure 6A:
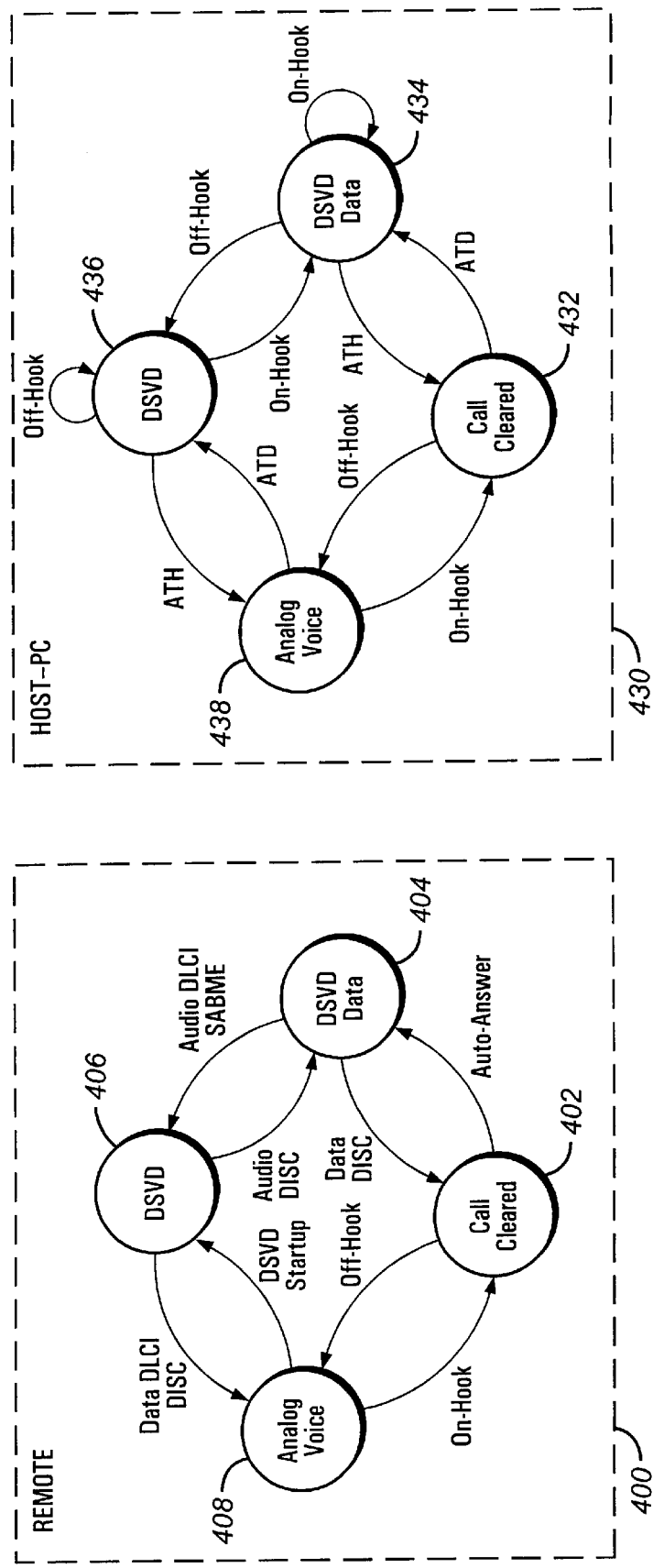
FIG. 6A is a state machine illustrating the operation of a pair of digital simultaneous voice and data modem.

Turning now to FIG. 6A, the flow chart illustrating the operation of the originate and answer DSVD modems is shown in more detail. The state machine illustrating the operation of the answer DSVD modem is shown in block 400, while the state machine of the originate DSVD modem is illustrated in block 430. In block 400, initially the DSVD modem is in a CALL_CLEARED state 402. From state 402, in the event that the DSVD modem receives a call while under an autoanswer mode, the DSVD modem transitions from the CALL_CLEARED state 402 to a DSVD_DATA state 404. While in state 404, in the event that the data session is disconnected (DISC), the state machine of the DSVD modem transitions from state 404 back to state 402. Furthermore, while in the DSVD data state 404, in the event that an audio data link connection identifier (DLCI) is identified to indicate that both voice and data are being communicated, the state machine for the DSVD modem transitions from state 404 to a DSVD state 406. Once in the DSVD state 406, in the event that an audio disconnect (DISC) signal is received, the state machine of the DSVD modem transitions back from the simultaneous voice/data communication mode of the DSVD state 406 back to the DSVD_DATA state 404 to receive only data transmissions.

While in the DSVD state 406, in the event that a data DLCI disconnect sequence is received to indicate the termination of data transmission, the state machine of the DSVD modem transitions from the DSVD state 406 to an ANALOG_VOICE_STATE 408. In the ANALOG_VOICE state 408, the DSVD compatible devices simply switch the analog voice call to the down line phones, thus completing a normal phone connection. No data transmission takes place and the call can be terminated in the normal fashion by placing the down-line phone on hook.

Further, while in the ANALOG_VOICE state 408, if a DSVD startup sequence is detected indicating a request for simultaneous voice/data transmission, the state machine of the DSVD modem transitions from state 408 to the DSVD state 406. Alternatively, in the event that the state machine of the DSVD modem is in the ANALOG_VOICE_STATE 408 and that an on-hook sequence is detected, the DSVD modem transitions from the ANALOG_VOICE state 408 to the CALL_CLEARED state 402 where it awaits the next communication by the user or the computer S. Furthermore, in the event that the DSVD modem is already in the CALL_CLEARED state 402 and that an off-hook signal is received, the DSVD modem transitions from the CALL_CLEARED state 402 back to the ANALOG_VOICE_STATE 408.

Thus, while in the DSVD state 406, when a disconnect (DISC) frame is received on the data DLCI frame, the DSVD modem completes an orderly shut-down of both the audio DLCI and the data DLCI connections and the call reverts to the ANALOG_VOICE state 408. Furthermore, while in the DSVD state 406, when the DISC frame is received on the audio DLCI, the call transitions to the DSVD_DATA state 404. While in the DSVD_DATA state 404, when an audio disconnect SABME frame is received on the audio DLCI, the call transitions to the DSVD state 406 and compressed audio is multiplexed with data. While in the DSVD_DATA state 404, when the DISC frame is received on the data DLCI, the data connection is shut down and the call is dropped.

The state machine 430 of the DSVD modem has four states: a CALL_CLEARED state 432, a DSVD_DATA state 434, and DSVD state 436 and an ANALOG_VOICE state 438. Upon reset, the state machine of the host DSVD modem resides in the CALL_CLEARED state 432.

From the CALL_CLEARED state 432, in the event that a dial (ATD) sequence is received, the DSVD modem transitions to the DSVD_DATA state 434. The DSVD modem remains in this state as long as the on-hook signal is on. Alternatively, in the event that a hang-up (ATH) handshake signal is received, the DSVD modem transitions from the DSVD_DATA state 434 back to the CALL_CLEARED state 432.

Alternatively, in the event that an off-hook signal is received while the DSVD modem is in the DSVD_DATA state 434, the unit transitions to the DSVD state 436. The DSVD modem remains in state 436 as long as the off-hook signal is asserted. Alternatively, if an ATH signal is received, the DSVD modem transitions from the DSVD state 436 to the ANALOG_VOICE state 438. In the ANALOG_VOICE state 438, the DSVD compatible devices simply switch the analog voice call to the down line phones, thus completing a normal phone connection. No data transmission takes place and the call can be terminated in the normal fashion by placing the down-line phone on hook.

From the ANALOG_VOICE state 438, if an ATD signal is received, the DSVD modem transitions back to the DSVD 436 state. Alternatively, while in the ANALOG_VOICE state 438, in the event that an on-hook signal is received, the DSVD modem transitions from the ANALOG_VOICE state 438 back to the CALL_CLEARED state 432. In the DVSD state 436, the analog voice signal from the down-line phone is sampled and digitally compressed for transmission. The compressed voice data is then multiplexed with the user data using the V.42/LAPM datalink protocol and transmitted to another DSVD capable unit. Using the extended function of the DSVD protocol, data and voice frames are transmitted using two logical data channels over a single physical phone line using standard serial data function. Furthermore, the data and voice frames are multiplexed using the V.42/LAPM protocol. the LAPM protocol provides for multiple logical channels between units using a single physical connection. Data and voice frame length are determined by parameters using the DSVD start-up protocol.

Figure 6B:
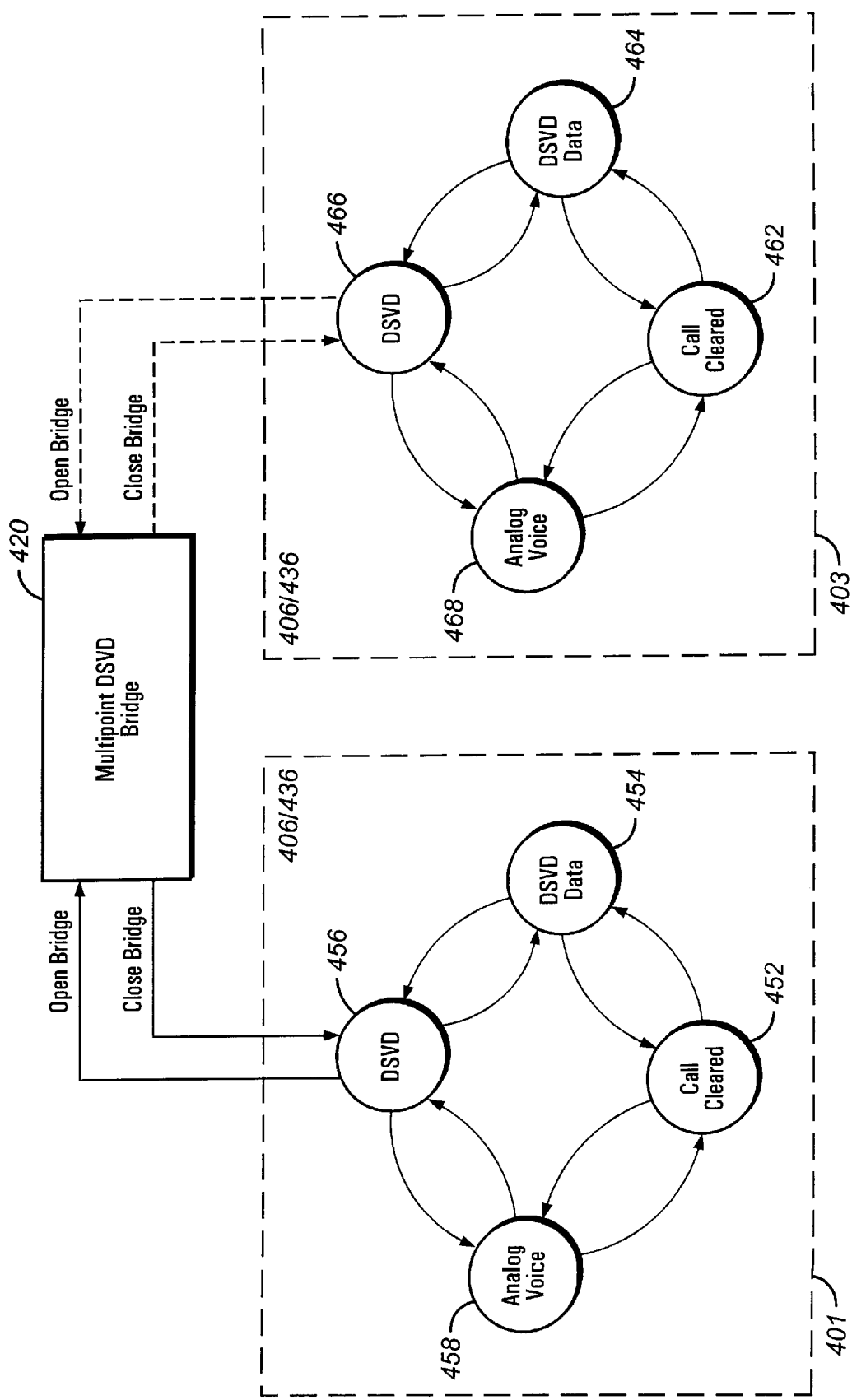
FIG. 6B is a state machine illustrating the operation of the two remote digital simultaneous voice and data modem in conjunction with the bridge of the multipoint DSVD system of the present invention.

Turning now to FIG. 6B, the operation of the state machines of FIG. 6A in conjunction with the bridge 211 is shown in more detail. In FIG. 6A, state machine modules 401 and 403 representative of the state machine of first and second connections are shown. The modem of the first DSVD connection travels amongst previously described four states in the module 401: a CALL_CLEARED state 452, a DSVD_DATA state 454, a DSVD state 456, and an ANALOG_VOICE state 458. Similarly, the modem of the second DSVD connection travels amongst four states in the module 402: a CALL_CLEARED state 462, a DSVD_DATA state 464, a DSVD state 466, and an ANALOG_VOICE state 468. Each of DSVD state 456 or 466 can be in one of the originate or answer DSVD state 406 or 436, as discussed in FIG. 6A.

Additionally, while in the DSVD state 456, in the event that a multipoint open DSVD sequence is initiated, the first DSVD modem transitions from the DSVD state 456 to a BRIDGE_ON state 420 where data can be shared in a multipoint manner with other DSVD modems using the bridge 211 of FIG. 3. Similarly, while in the DSVD state 466, in the event an open DSVD bridge signal is received, the second DSVD modem transitions to the BRIDGE_ON state 420 where the bridge 211 connects the DSVD modems together to provide a multilink connection. Furthermore, while in the BRIDGE_ON state 420, in the event that a close DSVD bridge signal is received, the link between the DSVD sessions is disconnected, thus ending the multipoint session.

Figure 7:
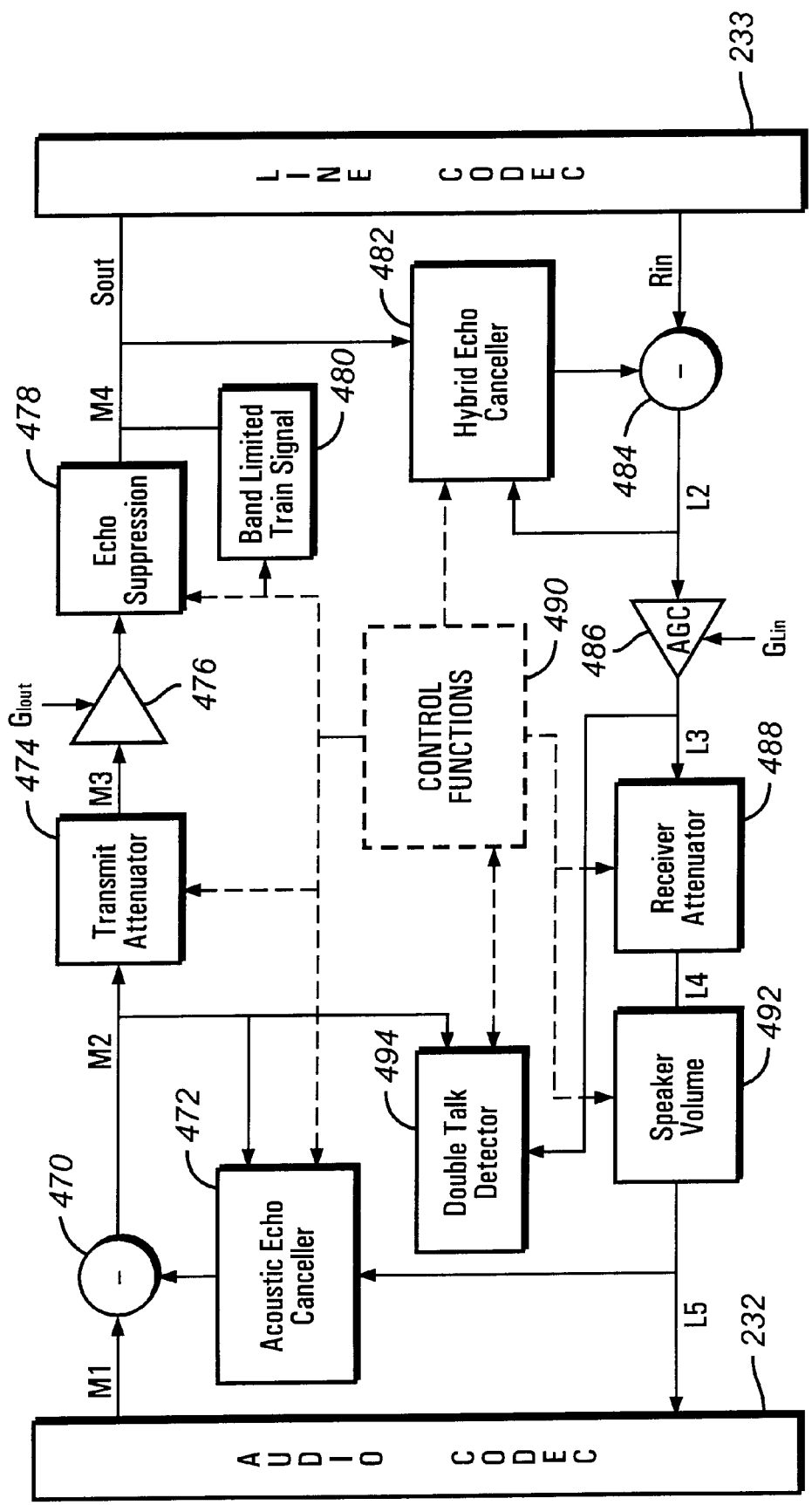
FIG. 7 is a block diagram of a full duplex speaker telephone operating in conjunction with the multipoint DSVD system of the present invention.

In addition to the multipoint DSVD system, a full duplex speaker telephone is also provided. As shown in FIG. 7, the full duplex speaker phone operates in parallel with the multipoint DSVD system of FIG. 3. From the audio CODEC 232 of FIG. 3, a subtractor 470 receives signals from the microphone 235. Further, the subtractor 470 receives echo replica from an acoustic echo canceller 472. The acoustic echo canceller 472 receives audio signals at the output of a speaker volume adjust unit 492 which drives the audio input of the audio CODEC 232.

The output of the subtractor 470 is provided to a transmit attenuator 474 which controls the amplitude of the incoming signal from the audio CODEC 232. The transmit attenuator 476 in turn drives an amplifier 476. The output of the amplifier 476 is provided to an echo suppression unit 478. The output of the echo suppression unit 478 is the input to the speech coder 240 of FIG. 3.

The output of the echo suppression unit 478 and the band limited train signal generator 482 is further provided to a hybrid echo canceller 482. The output of the hybrid echo canceller 482 is provided to a second subtractor 484. The second subtractor 484 further receives an input from the output of the line CODEC 233. The output of the subtractor 484 is provided to an automatic gain control (AGC) 486 and also as feedback signals to the hybrid echo canceller 482. The output of the AGC 486 is provided to a receiver attenuator 488 which controls the amplitude of the signal going to the speaker volume control unit 492. The output of the AGC 486 is also provided to a double talk detector 494. The double talk detector 494 further receives the input to the transmit attenuator unit 474. To control the units of FIG. 7, a control function module 490 is provided.

Figure 8:
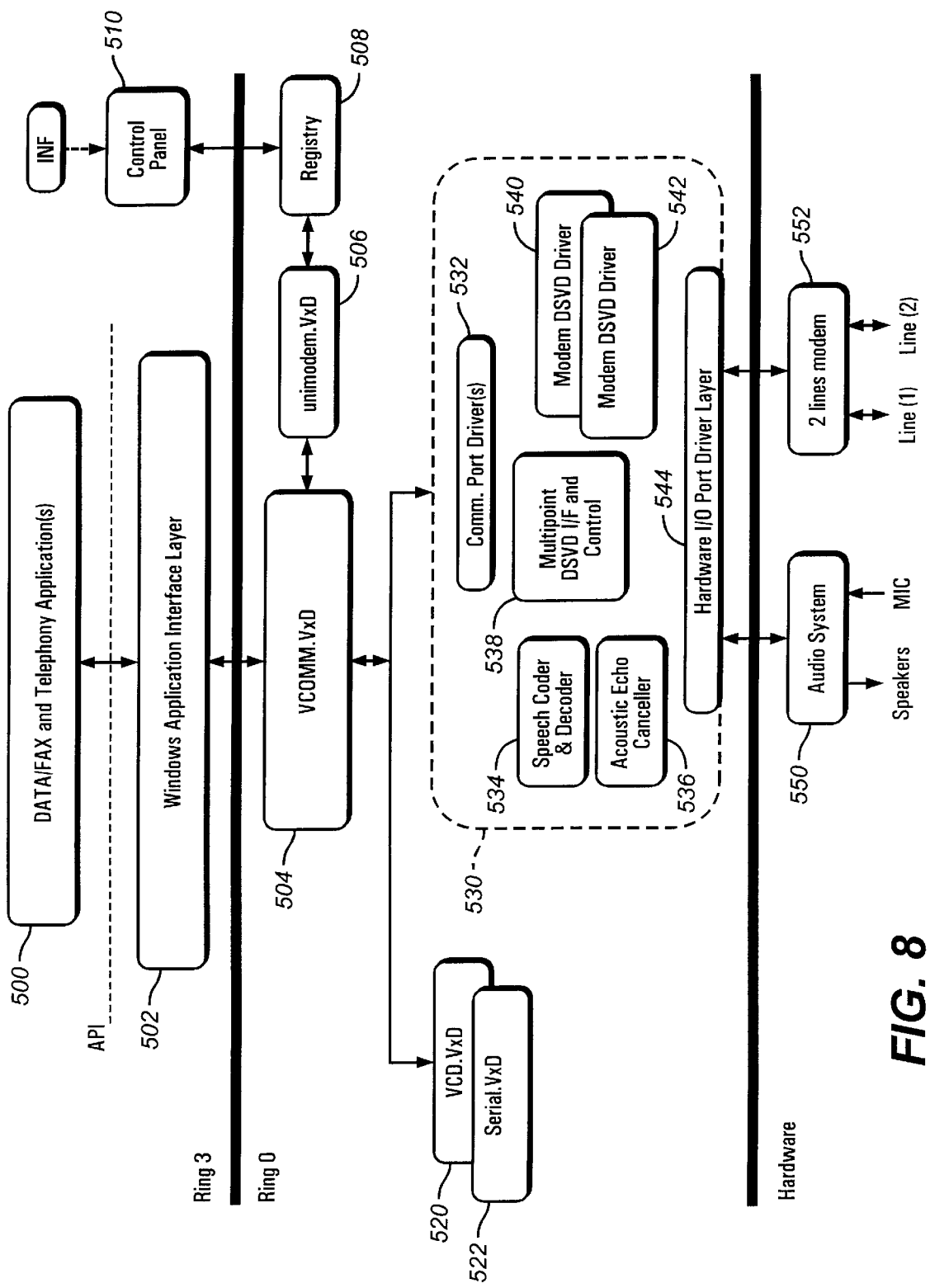
FIG. 8 is a diagram illustrating the software modules operating in conjunction with the operating system for the computer system of FIG. 1 for supporting the multipoint DSVD system and the full duplex speaker telephone of the present invention.

Turning now to FIG. 8, a block diagram of major modules in the Windows software supporting the multipoint DSVD system and the full duplex speaker telephone system of the present invention is shown in more detail. In FIG. 8, one or more data/fax and telephony application software modules 500 communicate with a Windows application interface layer 502 via an application programming interface (API), which is a defined set of functions provided by the operating system for use by the application software 500. The Windows application interface layer 502 typically resides at a ring 3 of the Windows 95 registered operating system. Ring 3 eventually communicates to a more secure ring 0 of the Windows 95 operating system, as known to those skilled in the art.

On the other side of ring 0 is a VCOMM.VxD 504. The VCOMM.VxD 504 is a virtual device manager that manages all access to communication resources. The port drivers typically use the VCOMM.VxD services to register themselves and block others access to communications hardware when they want to occupy the hardware. The VCOMM.VxD 504 further communicates with a VCD.VxD 520 and a Serial.VxD 522. Other virtual device drivers, referred to as client VxDs, use VCOMM services to access communications resources as well.

In addition, a control panel 510 also exists at the ring 3 level of Windows 95 operating system registry. The control panel 510 receives information from the user for customizing a registry 508 which is located at the ring 0 security level. The registry 508 is a structured file that stores index information describing the host system's hardware, user preferences and other configuration data. In Windows 95, the registry 508 reduces the proliferation of configuration files that can plague a Windows machine. The registry 508, in turn, communicates with a unimodem.VxD 506. The unimodem .VxD 506 in turn communicates with the VCOMM.VxD504.

The control panel 510 receives information entered by the user when the user double clicks on a "Modems" icon in the Windows 95 control panel. The control panel allows users to install modems into the Windows 95 registry 508 and configure the default settings. The input to the control panel 510 is an INF file. The Windows 95 format INF text file specifies the command set and the response code registry keys for one or more modems. In this manner, the modem's control panel creates registry keys for each modem that it installs from the modem information (INF) files. The modem control panel 510 thus reads the modem INF file to create modem registry keys.

Referring to the unimodem.VxD 506, it is both a telephone application programming interface (TAPI) service provider and a VCOMM device driver. The unimodem. VxD 506 translates TAPI function calls into AT commands to configure, dial and answer modems. The unimodem. VxD 506 further reads modem commands from the modem registry keys created by the modem's control panel 510. Thus, the unimodem.VxD506 reads the modem keys and determines the modem commands and response codes.

The VCOMM. VxD 504 also communicates with a multipoint DSVD driver 530. The driver 530 in turn includes a communication port 532. The communication port drivers 532 are virtual devices (VxDs) that the virtual communications driver (VCOMM 504) uses to access communication ports. Port drivers for common serial and line printer devices are included with Windows 95. These port drivers are loaded either during boot time or upon demand, depending on the version of Windows and whether the port driver is plug and play compliant.

Additionally, the multipoint DSVD driver 530 includes a speech coder and decoder module 534, an acoustic echo canceler 536, a multipoint DSVD interface and control module 538, and one or more modem DSVD drivers 540 and 542. These subcomponents of the module 530 in turn communicate to a hardware input/output port driver layer 544. The hardware I/O port driver layer 544 in turn communicates with the actual multipoint DSVD system 151 which includes the audio system 550 for driving speakers and receiving input form the microphone as well as two or more modems 552 for accessing the POTS 181.

In sum, the bridge 184 (FIG. 2A) of the present invention and the first and second DSVD modems 182 and 186 support the transmission of data between the first and second remote DSVD modems 180 and 188. The bridge 184 contains a speech decoder 212 adapted to receive data from the first and second remote DSVD modems 180 and 188, first and second summers 220 and 238, the speech coder 240 which is adapted to send data to the first and second remote DSVD modems 180 and 188, and a digital data router 214 for collecting digital data from the first and second remote DSVD modems 180 and 188 and forwarding the digital data to first remote DSVD modems 180, the second remote DSVD modems 188, or both. To convert the digital data back into the analog domain, the system has a sound generator or speaker 234, a microphone 235 adapted to receive sound, and an acoustic echo cancelling system 230 for minimizing echo feedbacks from the speaker 234.

The disclosed multipoint system can hook up two lines or two parties to converse with, if each party has a DSVD modem. Furthermore, the multipoint system can connect to yet another line, with considerations to the physical limits of the host computer, such that multiple users at different stations can communicate with each other with the multipoint DSVD. Further, as the present invention shifts some of the work to the processor of the computer system S, such as the echo canceller, the speech coder and decoder, the present invention provides a cost effective multipoint conferencing system.

Thus, the multipoint conferencing system of the present invention enables the sharing of data and the exchange of voice information over a network of DSVD modems. The multi-point communication capability of the present invention facilitates both audiovisual and data communications, overcoming current point-to-point network constraints. The multiple DSVD connections thus support multiple users who need to share the data and exchange voice simultaneously over the same link. In this manner, the present invention supports an effective group working atmosphere using communications facilities that can join together more than two locations.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A multipoint conferencing system for communicating with a first remote digital simultaneous voice and data (DSVD) modem and a second remote DSVD modem, said multipoint conferencing system comprising:
    a first DSVD modem adapted to communicate with said first remote DSVD modem;
    a second DSVD modem adapted to communicate with said second remote DSVD modem;
    an audio/data source adapted to communicate with said first remote DSVD modem and with said second remote DSVD modem; and
    a bridge coupled to said first and second DSVD modems and said audio/data source, said bridge transferring data and digitized audio signal among said audio/data source, said first DSVD remote modem by way of said first DSVD modem and said second remote DSVD modem by way of said second DSVD modem.

2. The multipoint conferencing system of claim 1, wherein said first DSVD modem further comprises:
    an analog to digital converter; and
    a digital signal processor coupled to said analog to digital converter for receiving data from said first remote DSVD modem.

3. The multipoint conferencing system of claim 2, wherein each of said DSVD modems further comprises a digital to analog converter coupled to said digital signal processor for transmitting data to one of said remote DSVD modems.

4. The multipoint conferencing system of claim 1, wherein said second DSVD modem further comprises:
    an analog to digital converter; and
    a digital signal processor coupled to said analog to digital converter for receiving data from said second remote DSVD modem.

5. The multipoint conferencing system of claim 1, wherein said bridge further comprises:
    a speech decoder adapted to receive data from said first and second remote DSVD modems; and
    a first summer coupled to the output of said speech decoder.

6. The multipoint conferencing system of claim 5, further comprising:
    a second summer coupled to said first summer;
    a speech coder coupled to said second summer, said speech coder adapted to send data to said first and second remote DSVD modems.

7. The multipoint conferencing system of claim 1, further comprising a digital data router, said digital data router adapted to collect digital data from said first and second remote DSVD modems and forward said digital data to first remote DSVD modems, said second remote DSVD modems, or both.

8. The multipoint conferencing system of claim 1, wherein said bridge further comprises:
    a speech decoder adapted to receive data from said first and second remote DSVD modems;
    a first summer coupled to the output of said speech decoder;
    a second summer coupled to said first summer;
    a speech coder coupled to said second summer, said speech coder adapted to send data to said first and second remote DSVD modems; and
    a digital data router, said digital data router adapted to collect digital data from said first and second remote DSVD modems and forward said digital data to first remote DSVD modems, said second remote DSVD modems, or both.

9. The multipoint conferencing system of claim 1, wherein said bridge has an audio output and an audio input, further comprising:
    a sound generator coupled to the output of said bridge;
    a microphone adapted to receive sound;
    an acoustic echo cancelling system coupled to said microphone and to said audio output and input of said bridge.

10. The multipoint conferencing system of claim 9, wherein said acoustic echo cancelling system further comprises:
    an echo canceller coupled to the output of said bridge; and
    a subtractor coupled to said microphone and said echo canceller, said subtractor removing echo associated with said sound generator.

11. The multipoint conferencing system of claim 1, wherein the audio/data source comprises a third DSVD modem.

12. The multipoint conferencing system of claim 1, wherein the audio/data source comprises a codec within the multipoint conferencing system.

13. A computer system with a multipoint conferencing system for communicating with a first remote digital simultaneous voice and data (DSVD) modem and a second remote DSVD modem, said multipoint conferencing system comprising:
    a processor;
    a memory coupled to said processor;
    a display coupled to said processor;
    a data storage device coupled to said processor;
    a first DSVD modem coupled to said processor, said first DSVD modem adapted to communicate with said first remote DSVD modem;

a second DSVD modem coupled to said processor, said second DSVD modem adapted to communicate with said second remote DSVD modem;

an audio/data source adapted to communicate with said first DSVD modem and second DSVD modem; and a bridge coupled to said processor, said first and second DSVD modems and said audio/data source, said processor activating said bridge to transfer voice and data among said audio/data source, said first remote DSVD modem by way of said first DSVD modem and said second remote DSVD modem by way of said second DSVD modem in accordance with a predetermined sequence.

14. The computer system of claim 13, wherein said first DSVD modem further comprises:

an analog to digital converter; and a digital signal processor coupled to said analog to digital converter for receiving data from said first remote DSVD modem.

15. The computer system of claim 14, wherein each of said DSVD modems further comprises a digital to analog converter coupled to said digital signal processor for transmitting data to one of said remote DSVD modems.

16. The computer system of claim 13, wherein said second DSVD modem further comprises:

an analog to digital converter; and a digital signal processor coupled to said analog to digital converter for receiving data from said second remote DSVD modem.

17. The computer system of claim 13, wherein said bridge further comprises:

a speech decoder adapted to receive data from said first and second remote DSVD modems; and a first summer coupled to the output of said speech decoder.

18. The computer system of claim 17, further comprising:

a second summer coupled to said first summer;

a speech coder coupled to said second summer, said speech coder adapted to send data to said first and second remote DSVD modems.

19. The computer system of claim 13, further comprising a digital data router, said digital data router adapted to collect digital data from said first and second remote DSVD modems and forward said digital data to first remote DSVD modems, said second remote DSVD modems, or both.

20. The computer system of claim 13, wherein said bridge further comprises:

a speech decoder adapted to receive data from said first and second remote DSVD modems;

a first summer coupled to the output of said speech decoder;

a second summer coupled to said first summer;

a speech coder coupled to said second summer, said speech coder adapted to send data to said first and second remote DSVD modems; and a digital data router, said digital data router adapted to collect digital data from said first and second remote DSVD modems and forward said digital data to first remote DSVD modems, said second remote DSVD modems, or both.

21. The computer system of claim 13, wherein said bridge has an audio output and an audio input, further comprising:

a sound generator coupled to the output of said bridge;

a microphone adapted to receive sound; and an acoustic echo cancelling system coupled to said microphone and to said audio output and input of said bridge.

22. The computer system of claim 21, wherein said acoustic echo cancelling system further comprises:

an echo canceller coupled to the output of said bridge; and a subtractor coupled to said microphone and said echo canceller, said subtractor removing echo associated with said sound generator.

23. The computer system of claim 13, wherein the audio/data source comprises a third DSVD modem.

24. The computer system of claim 13, wherein the audio/data source comprises a codec within the computer system.

25. A multipoint conferencing system for communicating with a first remote digital simultaneous voice and data (DSVD) modem and a second remote DSVD modem, said multipoint conferencing system comprising:

a first DSVD modem adapted to communicate with said first remote DSVD modem, said first DSVD modem further having:

an analog to digital converter; and a digital signal processor coupled to said analog to digital converter for receiving data from said first remote DSVD modem;

a second DSVD modem adapted to communicate with said second remote DSVD modem, said second DSVD modem having:

an analog to digital converter; and a digital signal processor coupled to said analog to digital converter for receiving data from said second remote DSVD modem;

a bridge coupled to said first and second DSVD modems for transferring data and digitized audio signal between said first and second remote DSVD modems via said first and second DSVD modems, said bridge further having:

a speech decoder adapted to receive data from said first and second remote DSVD modems;

a first summer coupled to the output of said speech decoder;

a second summer coupled to said first summer;

a speech coder coupled to said second summer, said speech coder adapted to send data to said first and second remote DSVD modems; and a digital data router, said digital data router adapted to collect digital data from said first and second remote DSVD modems and forward said digital data to first remote DSVD modems, said second remote DSVD modems, or both;

a sound generator coupled to the output of said bridge;

a microphone adapted to receive sound; and an acoustic echo cancelling system coupled to said microphone and to said audio output and input of said bridge.

26. A multipoint conferencing system for communicating with a first remote digital simultaneous voice and data (DSVD) modem and a second remote DSVD modem, said multipoint conferencing system comprising:

a first DSVD modem adapted to communicate with said first remote DSVD modem;

a second DSVD modem adapted to communicate with said second remote DSVD modem; and a bridge coupled to said first and second DSVD modems, said bridge transferring data and digitized audio signal between said first and second remote DSVD modems by way of said first and second DSVD modems, the bridge comprising:

a speech decoder adapted to receive data from said first and second remote DSVD modems; and a first summer coupled to the output of said speech decoder.

27. The multipoint conferencing system of claim 26, further comprising:

a second summer coupled to said first summer; and a speech coder coupled to said second summer, said speech coder adapted to send data to said first and second remote DSVD modems.

28. A multipoint conferencing system for communicating with a first remote digital simultaneous voice and data (DSVD) modem and a second remote DSVD modem, said multipoint conferencing system comprising:

a first DSVD modem adapted to communicate with said first remote DSVD modem;

a second DSVD modem adapted to communicate with said second remote DSVD modem; and a bridge coupled to said first and second DSVD modems, said bridge transferring data and digitized audio signal between said first and second remote DSVD modems by way of said first and second DSVD modems, the bridge comprising:

a speech decoder adapted to receive data from said first and second remote DSVD modems;

a first summer coupled to the output of said speech decoder;

a second summer coupled to said first summer;

a speech coder coupled to said second summer, said speech coder adapted to send data to said first and second remote DSVD modems; and a digital data router, said digital data router adapted to collect digital data from said first and second remote DSVD modems and forward said digital data to first remote DSVD modems, said second remote DSVD modems, or both.

29. A computer system with a multipoint conferencing system for communicating with a first remote digital simultaneous voice and data (DSVD) modem and a second remote DSVD modem, said multipoint conferencing system comprising:

a processor;

a memory coupled to said processor;

a display coupled to said processor;

a data storage device coupled to said processor;

a first DSVD modem coupled to said processor, said first DSVD adapted to communicate with said first remote DSVD modem;

a second DSVD modem coupled to said processor, said second DSVD adapted to communicate with said second remote DSVD modem; and a bridge coupled to said processor and to said first and second DSVD modems, said processor activating said bridge to transfer voice and data between said first and second remote DSVD modems by way of said first and second DSVD modems in accordance with a predetermined sequence, the bridge comprising:

a speech decoder adapted to receive data from said first and second remote DSVD modems; and a first summer coupled to the output of said speech decoder.

30. The computer system of claim 29, further comprising:

a second summer coupled to said first summer;

a speech coder coupled to said second summer, said speech coder adapted to send data to said first and second remote DSVD modems.

31. A computer system with a multipoint conferencing system for communicating with a first remote digital simultaneous voice and data (DSVD) modem and a second remote DSVD modem, said multipoint conferencing system comprising:

a processor;

a memory coupled to said processor;

a display coupled to said processor;

a data storage device coupled to said processor;

a first DSVD modem coupled to said processor, said first DSVD adapted to communicate with said first remote DSVD modem;

a second DSVD modem coupled to said processor, said second DSVD adapted to communicate with said second remote DSVD modem; and a bridge coupled to said processor and to said first and second DSVD modems, said processor activating said bridge to transfer voice and data between said first and second remote DSVD modems by way of said first and second DSVD modems in accordance with a predetermined sequence, the bridge comprising:

a speech decoder adapted to receive data from said first and second remote DSVD modems;

a first summer coupled to the output of said speech decoder;

a second summer coupled to said first summer;

a speech coder coupled to said second summer, said speech coder adapted to send data to said first and second remote DSVD modems; and a digital data router, said digital data router adapted to collect digital data from said first and second remote DSVD modems and forward said digital data to first remote DSVD modems, said second remote DSVD modems, or both.

\* \* \* \* \*